US008537187B2

(12) United States Patent
Zeng

(10) Patent No.: US 8,537,187 B2
(45) Date of Patent: Sep. 17, 2013

(54) THERMAL TRANSFER PRINTING DEVICE

(75) Inventor: Jian Zeng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/459,499

(22) Filed: Apr. 30, 2012

(65) Prior Publication Data

US 2013/0208072 A1 Aug. 15, 2013

(30) Foreign Application Priority Data

Feb. 15, 2012 (CN) .......................... 2012 1 0036680

(51) Int. Cl.
*G01D 15/16* (2006.01)

(52) U.S. Cl.
USPC .......................................................... 347/217

(58) Field of Classification Search
USPC ......................... 347/171-176, 213, 215, 217; 400/120.01-120.04
See application file for complete search history.

(56) References Cited

U.S. PATENT DOCUMENTS

| | | | | |
|---|---|---|---|---|
| 6,271,872 | B1 * | 8/2001 | Nagata | 347/171 |
| 7,309,178 | B2 * | 12/2007 | Ikeda | 347/217 |
| 7,651,287 | B2 * | 1/2010 | Numata et al. | 347/217 |
| 7,760,218 | B2 * | 7/2010 | Arai et al. | 347/171 |

* cited by examiner

*Primary Examiner* — Kristal Feggins
(74) *Attorney, Agent, or Firm* — Kirton McConkie; Evan R. Witt

(57) ABSTRACT

A thermal transfer printing device includes a thermal transfer printing module and a paper ejecting module. The paper ejecting module includes a D-shaped ejecting roller, a driving gear, a switching roller, a spring, and a stopper. During a thermal transfer paper is printed by the thermal transfer printing module, the spring provides a friction force to the switching roller. In response to the friction force, the switching roller is driven by the driving gear, and the D-shaped ejecting roller is not contacted with the thermal transfer paper. After the printing task of the thermal transfer printing module is completed, the friction force provided by the spring allows the D-shaped ejecting roller to transport the thermal transfer paper.

10 Claims, 5 Drawing Sheets

THERMAL TRANSFER PRINTING DEVICE

FIELD OF THE INVENTION

The present invention relates to a printing device, and more particularly to a thermal transfer printing device.

BACKGROUND OF THE INVENTION

Printing devices are peripherals for printing characters and/or graphics on papers or other kinds of printing media. Generally, the printing devices are classified into two types: ordinary printing devices and thermal transfer printing devices. The configurations of the thermal transfer printing devices are substantially identical to those of the ordinary printing devices except for the printing way. For example, the ordinary printing device supplies ink or toner onto a paper. Whereas, a thermal transfer printing device has a thermal transfer printing module for outputting the image. The thermal transfer printing module has a thermal print head (TPH) to heat a coating and allow the coating to be adsorbed on a thermal transfer paper, so that the image is printed out. The widely-used thermal transfer printing devices include for example faxing machines, POS (Point of Sale) printers and barcode printers.

FIG. 1 is a schematic side view illustrating a conventional thermal transfer printing device. As shown in FIG. 1, the conventional thermal transfer printing device 1 comprises a casing 10, a thermal transfer paper 11, a thermal transfer printing module 12, a transport roller assembly 13, and an ejecting roller assembly 14. Generally, the thermal transfer paper 11 is wound as a paper roll for storage, and disposed within the casing 10. The thermal transfer paper 11 has a first end 111 in contact with the transport roller assembly 13. The transport roller assembly 13 is contacted with the thermal transfer paper 11 for transporting the thermal transfer paper 11 to the thermal transfer printing module 12. The thermal transfer printing module 12 is arranged downstream of the transport roller assembly 13 for printing an image on the thermal transfer paper 11. The thermal transfer printing module 12 comprises a thermal print head 121 and a print roller 122. The thermal print head 121 is used for heating a coating (not shown) and allowing the coating to be adsorbed on the thermal transfer paper, thereby printing out the image. The print roller 122 is disposed under the thermal print head 121. The print roller 122 is used for transporting the thermal transfer paper 11 and pressing the thermal transfer paper 11. Consequently, the thermal transfer paper 11 is smoothly transported across the region under the thermal print head 121 while maintaining the printing performance. The ejecting roller assembly 14 is arranged downstream of the thermal transfer printing module 12 for ejecting the thermal transfer paper 11 out of the casing 10.

A process of printing the thermal transfer paper 11 by the thermal transfer printing module 12 will be illustrated as follows. Firstly, the first end 111 of the thermal transfer paper 11 is transported across and printed by the thermal transfer printing module 12. After the first end 111 of the thermal transfer paper 11 has been printed, the first end 111 of the thermal transfer paper 11 is continuously transported to the ejecting roller assembly 14, and a middle segment 112 of the thermal transfer paper 11 is continuously printed by the thermal transfer printing module 12. At this moment, the first end 111 of the thermal transfer paper 11 is transported by the ejecting roller assembly 14, and the middle segment 112 of the thermal transfer paper 11 is transported by the print roller 122. Moreover, the middle segment 112 of the thermal transfer paper 11 is transported by the print roller 122 at a first speed, and the first end 111 of the thermal transfer paper 11 is transported by the ejecting roller assembly 14 at a second speed. Ideally, the transporting speeds of the print roller 122 and the ejecting roller assembly 14 are equal. In practice, since the components of the thermal transfer printing device 1 have respective allowable tolerances, the accumulated allowable tolerance of the combined components will be increased. Consequently, the thermal transfer paper 11 is transported by ejecting roller assembly 14 at the second speed, which is slightly slower than the first speed.

Since the speed of transporting the first end 111 of the thermal transfer paper 11 is slower than the speed of transporting the middle segment 112 of the thermal transfer paper 11, the portion of the thermal transfer paper 11 between the first end 111 and the middle segment 112 is readily upturned during the printing process (see FIG. 1). Since the thermal transfer paper 11 is upturned, the thermal transfer paper 11 fails to be smoothly transported. Under this circumstance, the printing performance of the thermal transfer printing device 1 is deteriorated.

Therefore, there is a need of providing a thermal transfer printing device with enhanced printing performance.

SUMMARY OF THE INVENTION

The present invention provides a thermal transfer printing device with enhanced printing performance.

In accordance with an aspect of the present invention, there is provided a thermal transfer printing device. The thermal transfer printing device includes a thermal transfer printing module and a paper ejecting module. The thermal transfer printing module is for printing a thermal transfer paper. The paper ejecting module is arranged downstream of the thermal transfer printing module for outputting the thermal transfer paper. The paper ejecting module includes a D-shaped ejecting roller, a driving gear, a switching roller, a spring, and a stopper. The D-shaped ejecting roller is used for transporting the thermal transfer paper. The driving gear is connected with the D-shaped ejecting roller. The driving gear is not synchronously rotated with the D-shaped ejecting roller. The driving gear is driven to be rotated in a first rotating direction or a second rotating direction. The switching roller is connected with the D-shaped ejecting roller and synchronously rotated with the D-shaped ejecting roller for controlling whether the D-shaped ejecting roller is contacted with the thermal transfer paper or not. The spring is connected with the driving gear and the switching roller. In response to rotation of the driving gear, the spring provides a friction force to the switching roller, so that the switching roller is synchronously rotated with the driving gear. The stopper is disposed beside the switching roller. During the thermal transfer paper is printed by the thermal transfer printing module and the driving gear is rotated in the first rotating direction, the switching roller is stopped by the stopper from being rotated in the first rotating direction, so that the D-shaped ejecting roller is not contacted with the thermal transfer paper. After the thermal transfer paper has been printed and the driving gear is driven in the second rotating direction, in response to the friction force, the switching roller and the D-shaped ejecting roller are rotated in the second rotating direction, so that the D-shaped ejecting roller is contacted with the thermal transfer paper to output the thermal transfer paper.

In an embodiment, the D-shaped ejecting roller includes a D-shaped wheel and a transmission shaft. The D-shaped wheel is selectively contacted with the thermal transfer paper. When the D-shaped wheel is contacted with the thermal transfer paper, the thermal transfer paper is transported by the D-shaped wheel. The transmission shaft is penetrated through the D-shaped wheel, the driving gear and the switching roller.

In an embodiment, the D-shaped wheel includes a flat surface and an arc-shaped surface. When the D-shaped ejecting roller stops rotation with the switching roller, the flat surface is not contacted with the thermal transfer paper. When the D-shaped ejecting roller is rotated in the second rotating direction in response to the friction force, the arc-shaped surface is contacted with the thermal transfer paper to output the thermal transfer paper.

In an embodiment, the paper ejecting module further includes an upper cover and an ejecting idler assembly. The transmission shaft and the driving gear are covered by the upper cover, but the D-shaped wheel is exposed outside the upper cover. The ejecting idler assembly is disposed under the D-shaped ejecting roller for assisting in outputting the thermal transfer paper. When the D-shaped ejecting roller stops rotation with the switching roller, a gap is defined between the D-shaped ejecting roller and the ejecting idler assembly.

In an embodiment, the ejecting idler assembly includes an idler wheel and an idler spring. The idler wheel is disposed under the D-shaped ejecting roller for contacting the thermal transfer paper. The idler spring is used for providing an elastic force to the idler wheel, so that the thermal transfer paper is pressed by the idler wheel.

In an embodiment, the stopper includes a pivotal shaft and an extension arm. The pivotal shaft is disposed on the upper cover, and rotatable relative to the upper cover. The extension arm is extended from the pivotal shaft and permitted to be swung relative to the upper cover by using the pivotal shaft as a fulcrum. When the switching roller is rotated in the first rotating direction in response to the friction force, the extension arm is contacted with the switching roller to hinder rotation of the switching roller. When the switching roller is rotated in the second rotating direction, the extension arm is pushed by the switching roller, so that the extension arm is swung relative to the upper cover without hindering the switching roller from being rotated in the second rotating direction.

In an embodiment, the switching roller includes an outer surface and a notch. The outer surface is disposed on an outer periphery of the switching roller. When the switching roller is rotated in the second rotating direction, the stopper is pushed by the outer surface, so that the stopper is swung. During the stopper is swung, the stopper does not hinder the D-shaped ejecting roller from outputting the thermal transfer paper. The notch is disposed beside the outer surface. When the switching roller is rotated in the first rotating direction, the notch is contacted with the stopper, so that the switching roller is stopped by the stopper.

In an embodiment, a first terminal of the spring is sheathed and connected with the driving gear, and a second terminal of the spring is sheathed and connected with the switching roller.

In an embodiment, the thermal transfer printing device further includes an electrical energy storage element, a driving device, a transmission gear set, and a transport roller assembly. The electrical energy storage element is used for providing electricity. The driving device is connected with the electrical energy storage element. By acquiring the electricity from the electrical energy storage element, the driving device provides a motive power. The transmission gear set is connected with the driving device and the paper ejecting module for transmitting the motive power to the driving gear, so that the driving gear is rotated in the first rotating direction or the second rotating direction. The transport roller assembly is arranged upstream of the thermal transfer printing module for contacting the thermal transfer paper, thereby transporting the thermal transfer paper to the thermal transfer printing module.

In an embodiment, the thermal transfer printing module includes a thermal print head and a print roller. The thermal print head is used for heating the thermal transfer paper, thereby printing the thermal transfer paper. The print roller is disposed under the thermal print head. During the thermal transfer paper is printed by the thermal transfer printing module, the thermal transfer paper is transported and pressed by the print roller.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a thermal transfer printing device with enhanced printing performance.

Figure 1:
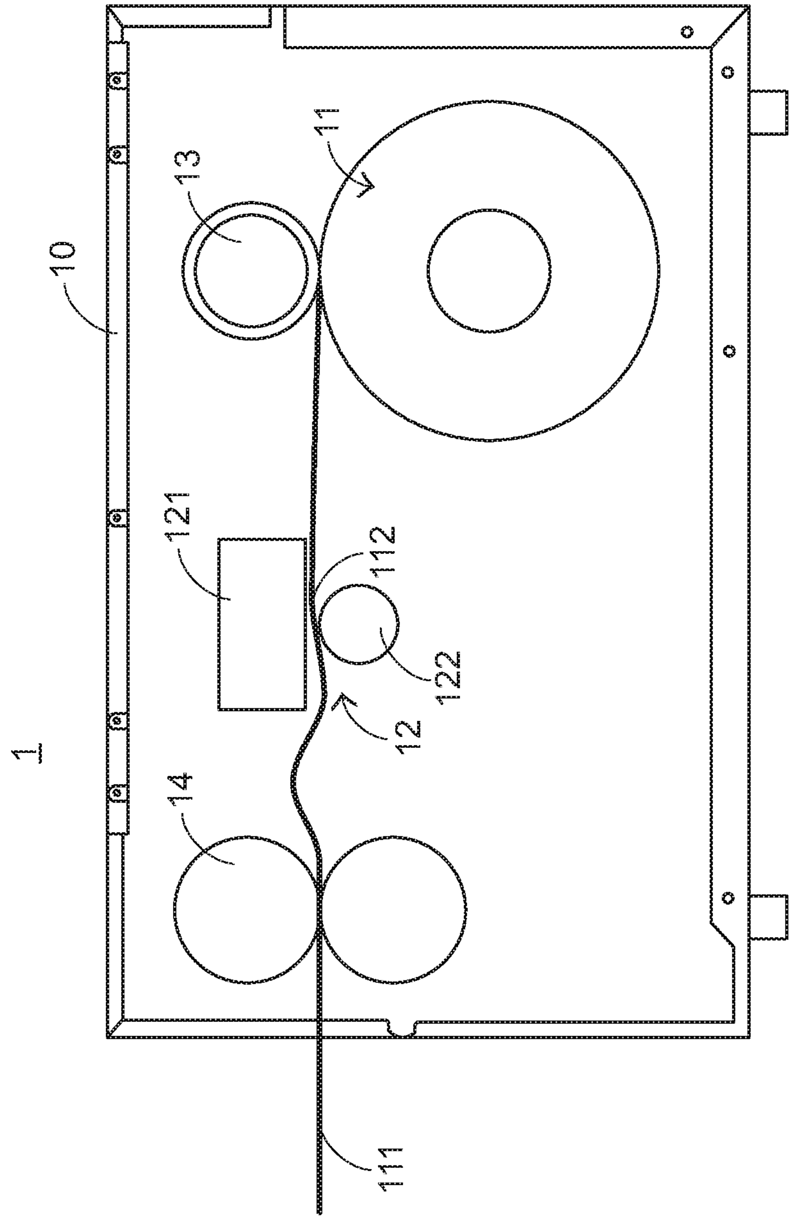
FIG. 1 PRIOR ART
FIG. 1 is a schematic side view illustrating a conventional thermal transfer printing device.
Figure 2:
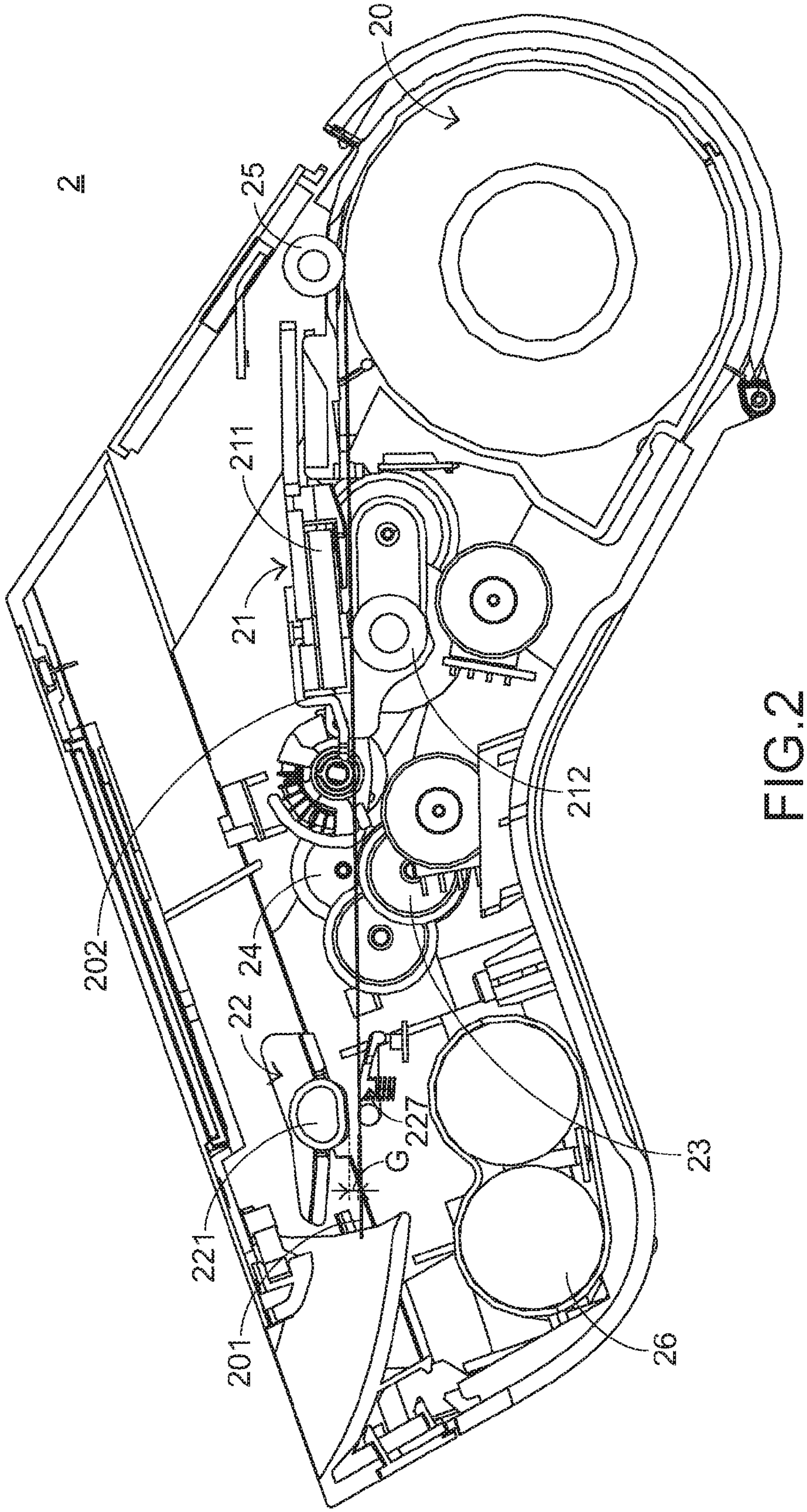
FIG. 2 is a schematic side view illustrating a thermal transfer printing device according to an embodiment of the present invention, in which the thermal transfer printing device is in a printing status.

FIG. 2 is a schematic side view illustrating a thermal transfer printing device according to an embodiment of the present invention, in which the thermal transfer printing device is in a printing status. As shown in FIG. 2, the thermal transfer printing device 2 comprises a thermal transfer printing module 21, a paper ejecting module 22, a driving device 23, a transmission gear set 24, a transport roller assembly 25, and an electrical energy storage element 26. The thermal transfer printing module 21 is disposed within the thermal transfer printing device 2 for printing an image on a thermal transfer paper 20. The thermal transfer paper 20 is wound as a paper roll, and disposed within the thermal transfer printing device 2. The paper ejecting module 22 is arranged downstream of the thermal transfer printing module 21 for ejecting the thermal transfer paper 20 out of the thermal transfer printing device 2. The electrical energy storage element 26 is used for providing electricity. The driving device 23 is connected with the electrical energy storage element 26 through a power wire (not shown). By acquiring the electricity from the electrical energy storage element 26, the driving device 23 provides a motive power. The transmission gear set 24 is connected with the driving device 23 and the paper ejecting module 22. Through the transmission gear set 24, the motive power from the driving device 23 is transmitted to the paper ejecting module 22. In this embodiment, the electrical energy storage element 26 is a battery, and the driving device 23 is a driving motor. The transport roller assembly 25 is arranged upstream of the thermal transfer printing module 21. The transport roller assembly 25 is contacted with the thermal transfer paper 20 for transporting the thermal transfer paper 20 to the thermal transfer printing module 21.

Please refer to FIG. 2 again. The thermal transfer printing module 21 comprises a thermal print head 211 and a print roller 212. The thermal print head 211 is used for heating a coating (not shown) and allowing the coating to be adsorbed on the thermal transfer paper 20, thereby printing out the image. The print roller 212 is disposed under the thermal print head 211. During the thermal transfer paper 20 is printed by the thermal transfer printing module 21, the print roller 212 is used for transporting the thermal transfer paper 20 and pressing the thermal transfer paper 20. Consequently, the thermal transfer paper 20 can be smoothly transported across the region under the thermal print head 211 while maintaining the printing performance. The paper ejecting module 22 is arranged downstream of the thermal transfer printing module 21 for outputting the thermal transfer paper 20.

Figure 3:
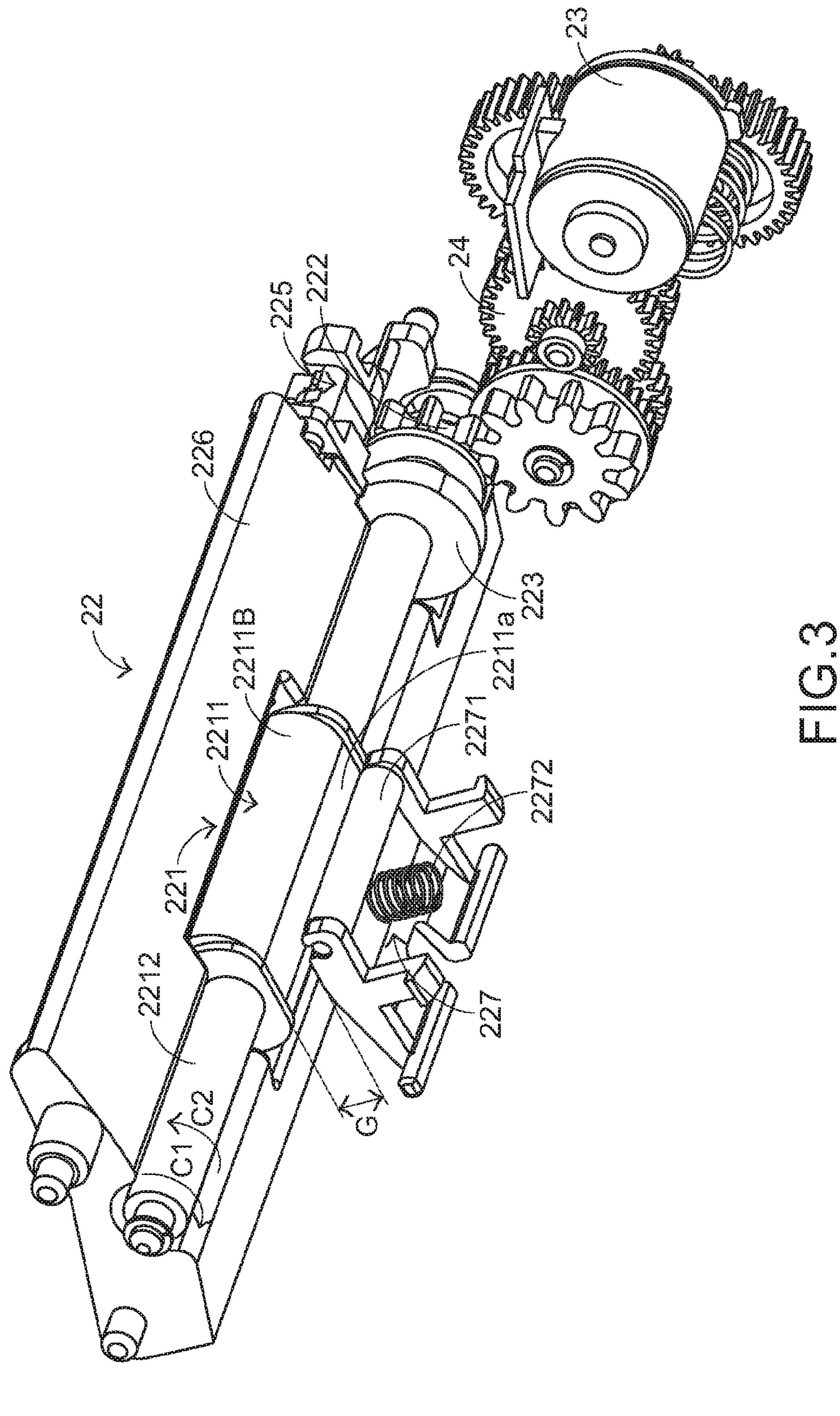
FIG. 3 is a schematic perspective view illustrating a paper ejecting module of a thermal transfer printing device according to an embodiment of the present invention.

Hereinafter, the paper ejecting module 22 will be illustrated in more details with reference to FIG. 3. FIG. 3 is a schematic perspective view illustrating a paper ejecting module of a thermal transfer printing device according to an embodiment of the present invention. The paper ejecting module 22 comprises a D-shaped ejecting roller 221, a driving gear 222, a switching roller 223, a spring 224 (see FIG. 4), a stopper 225, an upper cover 226, and an ejecting idler assembly 227. The driving gear 222 is connected with the D-shaped ejecting roller 221. Moreover, the driving gear 222 is not synchronously rotated with the D-shaped ejecting roller 221. The switching roller 223 is connected with the D-shaped ejecting roller 221, and synchronously rotated with the D-shaped ejecting roller 221. The spring 224 is arranged between the driving gear 222 and the switching roller 223, and connected with the driving gear 222 and the switching roller 223. The D-shaped ejecting roller 221 and the driving gear 222 are covered by the upper cover 226. The stopper 225 is disposed on the upper cover 226, and disposed beside the switching roller 223. The stopper 225 may be swung relative to the upper cover 226. The ejecting idler assembly 227 is disposed under the D-shaped ejecting roller 221. The ejecting idler assembly 227 comprises an idler wheel 2271 and an idler spring 2272.

As shown in FIG. 3, the driving device 23 is connected with the transmission gear set 24. In addition, the transmission gear set 24 is engaged with the driving gear 222, so that the motive power from the driving device 23 may be transmitted to the driving gear 222. In such way, the driving gear 222 may be rotated in a first rotating direction C1 or a second rotating direction C2.

Figure 4:
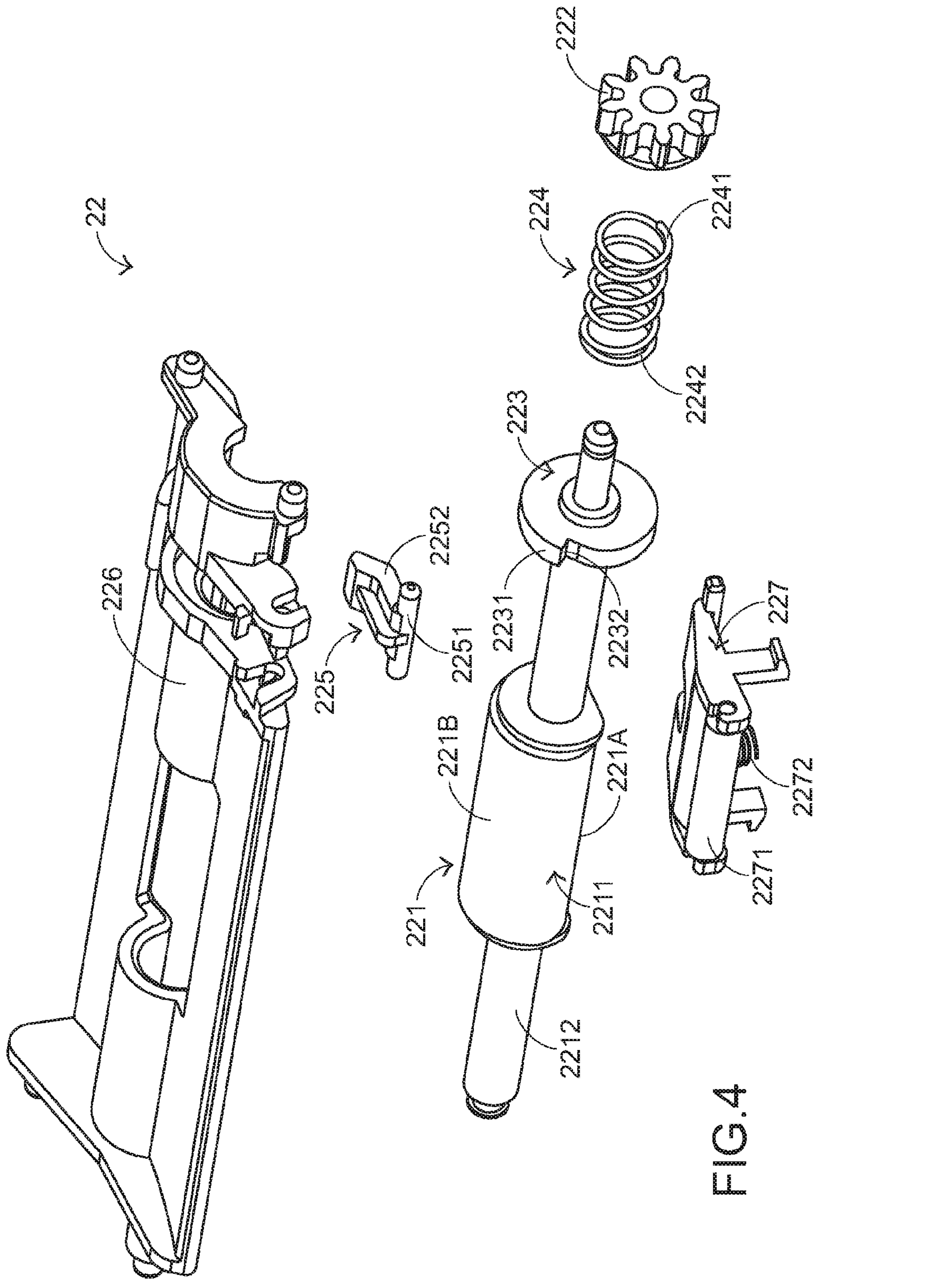
FIG. 4 is a schematic exploded view illustrating the paper ejecting module of FIG. 3.

Hereinafter, the detailed structures of the paper ejecting module 22 will be illustrated with reference to FIG. 4. FIG. 4 is a schematic exploded view illustrating the paper ejecting module of FIG. 3. The D-shaped ejecting roller 221 is used for transporting the thermal transfer paper 20. The D-shaped ejecting roller 221 comprises a D-shaped wheel 2211 and a transmission shaft 2212. The D-shaped wheel 2211 is selectively contacted with the thermal transfer paper 20. Once the D-shaped wheel 2211 is contacted with the thermal transfer paper 20, the thermal transfer paper 20 is transported by the D-shaped wheel 2211. The transmission shaft 2212 is penetrated through the D-shaped wheel 2211, the driving gear 222 and the switching roller 223. The switching roller 223 is fixed on the transmission shaft 2212, so that the switching roller 223 is synchronously rotated with the D-shaped ejecting roller 221. The driving gear 222 is not fixed on the transmission shaft 2212, so that the driving gear 222 is rotatable relative to the transmission shaft 2212. The transmission shaft 2212 of the D-shaped ejecting roller 221 is covered by the upper cover 226, but the D-shaped wheel 2211 is exposed outside the upper cover 226.

Please refer to FIGS. 3 and 4 again. The switching roller 223 is used for controlling whether the D-shaped ejecting roller 221 is contacted with the thermal transfer paper 20 or not. In response to rotation of the driving gear 222, the spring 224 is twisted to provide a friction force to the switching roller 223. In response to the friction force, the switching roller 223 is synchronously rotated with the driving gear 222. The operating mechanism of generating the friction force by the spring 224 will be illustrated as follows. Firstly, a first terminal 2241 of the spring 224 is sheathed and connected with the driving gear 222, and a second terminal 2242 of the spring 224 is sheathed and connected with the switching roller 223. Upon rotation of the driving gear 222, the spring 224 is correspondingly twisted. As the spring 224 is twisted, a friction force between the second terminal 2242 of the spring 224 and the switching roller 223 is generated. In response to the friction force, the switching roller 223 is rotated.

The stopper 225 is disposed on the upper cover 226 and contacted with the switching roller 223 for stopping the switching roller 223 from being rotated in the first rotating direction C1. The stopper 225 comprises a pivotal shaft 2251 and an extension arm 2252. The stopper 225 is disposed on the upper cover 226 through the pivotal shaft 2251. Moreover, the pivotal shaft 2251 is rotatable relative to the upper cover 226. The extension arm 2252 is extended from the pivotal shaft 2251. In addition, the extension arm 2252 may be swung relative to the upper cover 226 by using the pivotal shaft 2251 as a fulcrum. In this embodiment, the pivotal shaft 2251 and the extension arm 2252 are integrally formed.

Please refer to FIG. 4 again. The switching roller 223 comprises an outer surface 2231 and a notch 2232. The outer surface 2231 is disposed on an outer periphery of the switching roller 223. In a case that the switching roller 223 is rotated in the second rotating direction C2, the stopper 225 is pushed by the outer surface 2231 of the switching roller 223, so that the extension arm 2252 of the stopper 225 is swung. Moreover, during the extension arm 2252 is swung, the extension arm 2252 is not contacted with the switching roller 223. Consequently, the rotation of the switching roller 223 and the rotation of the D-shaped ejecting roller 221 will not be hindered by the extension arm 2252. The notch 2232 is disposed beside the outer surface 2231. In a case that the switching roller 223 is rotated in the first rotating direction C1, the notch 2232 is contacted with the extension arm 2252 of the stopper 225. Under this circumstance, since the switching roller 223 is stopped by the stopper 225, the rotation of the switching roller 223 and the rotation of the D-shaped ejecting roller 221 are stopped.

The D-shaped wheel 2211 of the D-shaped ejecting roller 221 comprises a flat surface 2211A and an arc-shaped surface 2211B. In a case that the D-shaped ejecting roller 221 stops rotation with the switching roller 223, the flat surface 2211A of the D-shaped wheel 2211 and the ejecting idler assembly 227 under the D-shaped wheel 2211 are separated from each other by a gap G (see FIG. 3). Whereas, in a case that the D-shaped ejecting roller 221 is rotated in the second rotating direction C2 in response to the friction force, the arc-shaped surface 2211B is contacted with the thermal transfer paper 20 to output the thermal transfer paper 20. The ejecting idler assembly 227 is used to assist in outputting the thermal transfer paper 20. The idler wheel 2271 of the ejecting idler assembly 227 is disposed under the D-shaped ejecting roller 221 for contacting the thermal transfer paper 20. The idler spring 2272 is used for providing an elastic force to the idler wheel 2271. When the D-shaped ejecting roller 221 is contacted with the thermal transfer paper 20, the elastic force causes the idler wheel 2271 to press the thermal transfer paper 20, thereby smoothly outputting the thermal transfer paper 20.

The operations of the thermal transfer printing device will be illustrated as follows. Please refer to FIGS. 2 and 3 again. For printing the thermal transfer paper 20 by the thermal transfer printing module 21, a first end 201 of the thermal transfer paper 20 is firstly contacted with the transport roller assembly 25, so that the thermal transfer paper 20 is transported to the thermal transfer printing module 21 by the transport roller assembly 25. Then, the first end 201 of the thermal transfer paper 20 is pressed by the print roller 212. Consequently, the first end 201 of the thermal transfer paper 20 is smoothly transported by the print roller 212, and the first end 201 of the thermal transfer paper 20 may be printed by the thermal print head 211. At the moment when the first end 201 of the thermal transfer paper 20 is printed by the thermal transfer printing module 21, the motive power generated by the driving device 23 is transmitted to the driving gear 222 through the transmission gear set 24, so that the driving gear 222 is rotated in the first rotating direction C1. As the driving gear 222 is rotated in the first rotating direction C1, the spring 24 connected with the driving gear 222 is twisted, so that the spring 24 provides a friction force to the switching roller 223. In response to the friction force, the switching roller 223 is synchronously rotated with the driving gear 222 in the first rotating direction C1. Similarly, the D-shaped ejecting roller 221 and the switching roller 223 are synchronously rotated in the first rotating direction C1.

In a case that the switching roller 223 is rotated in the first rotating direction C1, the notch 2232 is contacted with the extension arm 2252 of the stopper 225. Since the D-shaped ejecting roller 221 and the switching roller 223 are hindered by the extension arm 2252 from being continuously rotated in the first rotating direction C1, the rotation of the D-shaped ejecting roller 221 and the rotation of the switching roller 223 are stopped. Since the switching roller 223 is hindered by the extension arm 2252 from being continuously rotated, the spring 24 on the switching roller 223 results in idle running. Moreover, the driving gear 222 is continuously rotated in the first rotating direction C1. Under this circumstance, the flat surface 2211A of the D-shaped ejecting roller 221 is rotated to face the underlying ejecting idler assembly 227. Meanwhile, a gap G is defined between the flat surface 2211A and the ejecting idler assembly 227. After the first end 201 of the thermal transfer paper 20 has been printed, the first end 201 of the thermal transfer paper 20 is continuously transported to the paper ejecting module 22. Meanwhile, a middle segment 202 of the thermal transfer paper 20 is transported to the thermal transfer printing module 21 by the transport roller assembly 25. At the same time, the first end 201 of the thermal transfer paper 20 is transported across the gap G between the flat surface 2211A and the ejecting idler assembly 227, but is not contacted with the D-shaped wheel 2211. On the other hand, since the middle segment 202 of the thermal transfer paper 20 is pressed by the print roller 212, the middle segment 202 of the thermal transfer paper 20 can be smoothly transported by the print roller 212.

During the process of printing the middle segment 202 of the thermal transfer paper 20, since the first end 201 of the thermal transfer paper 20 is not contacted with the D-shaped wheel 2211, the first end 201 of the thermal transfer paper 20 is not transported by the D-shaped wheel 2211. In other words, the middle segment 202 of the thermal transfer paper 20 is only transported by the print roller 212 in order to be printed. Under this circumstance, since the problem of resulting in the speed difference of different rollers is eliminated, the printing performance will not be deteriorated.

Figure 5:
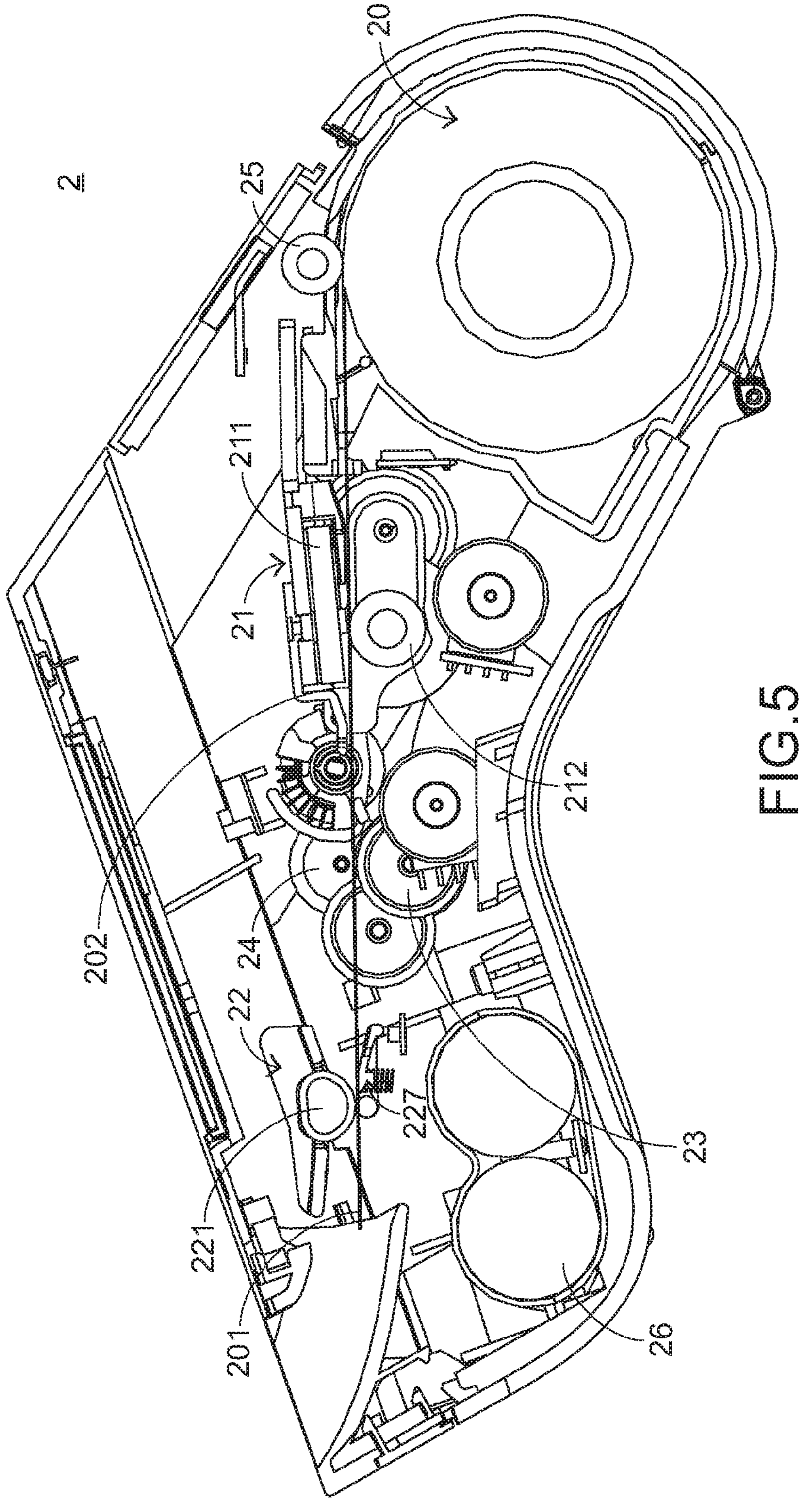
FIG. 5 is a schematic side view illustrating a thermal transfer printing device according to an embodiment of the present invention, in which the thermal transfer printing device is in a paper-ejecting status.

FIG. 5 is a schematic side view illustrating a thermal transfer printing device according to an embodiment of the present invention, in which the thermal transfer printing device is in a paper-ejecting status. Please refer to FIGS. 4 and 5. After the middle segment 202 of the thermal transfer paper 20 has been printed, the driving device 23 is reversely rotated to output the motive power. The motive power is transmitted to the driving gear 222 through the transmission gear set 24, so that the driving gear 222 is rotated in the second rotating direction C2. As the driving gear 222 is rotated in the second rotating direction C2, the spring 24 connected with the driving gear 222 is twisted, so that the spring 24 provides a friction force to the switching roller 223. In response to the friction force, the switching roller 223 is synchronously rotated with the driving gear 222 in the second rotating direction C2. Similarly, the D-shaped ejecting roller 221 and the switching roller 223 are synchronously rotated in the second rotating direction C2.

In a case that the switching roller 223 is rotated in the second rotating direction C2 and the outer surface 2231 of the switching roller 223 is contacted with the extension arm 2252 of the stopper 225, the extension arm 2252 is pushed by the outer surface 2231. Consequently, the extension arm 2252 is swung relative to the upper cover 226 by using the pivotal shaft 2251 as a fulcrum. In addition, the extension arm 2252 is swung to the location where the outer surface 2231 is not contacted with the extension arm 2252. Consequently, the rotation of the switching roller 223 in the second rotating direction C2 is not hindered by the extension arm 2252. That is, the rotation of the D-shaped ejecting roller 221 is not hindered.

Under this circumstance, the arc-shaped surface 2211B of the D-shaped ejecting roller 221 is rotated to face the underlying ejecting idler assembly 227. Consequently, the arc-shaped surface 2211B of the D-shaped ejecting roller 221 is contacted with the first end 201 of the thermal transfer paper 20, and the first end 201 of the thermal transfer paper 20 is transported and outputted by the D-shaped ejecting roller 221. At the same time, the ejecting idler assembly 227 assists in outputting the first end 201 of the thermal transfer paper 20. The D-shaped ejecting roller 221 is continuously rotated in the second rotating direction C2 until the middle segment 202 of the thermal transfer paper 20 is outputted.

For printing the subsequent segment of the thermal transfer paper 20, the driving gear 222 is reversely rotated in the first rotating direction C1 again. As the driving gear 222 is rotated in the first rotating direction C1, the spring 24 connected with the driving gear 222 is twisted, so that the spring 24 provides a friction force to the switching roller 223. In response to the friction force, the switching roller 223 is synchronously rotated with the driving gear 222 in the first rotating direction C1. Similarly, the D-shaped ejecting roller 221 is also rotated in the first rotating direction C1. As shown in FIG. 4, the extension arm 2252 of the stopper 225 has a curvy profile. Consequently, as the switching roller 223 is rotated in the first rotating direction C1, the notch 2232 of the switching roller 223 will be contacted with the curvy extension arm 2252. Consequently, the extension arm 2252 is swung relative to the upper cover 226 by using the pivotal shaft 2251 as a fulcrum. In addition, the extension arm 2252 is swung to a location where the notch 2232 is stopped by the extension arm 2252. Until the notch 2232 is contacted with the extension arm 2252 again, the extension arm 2252 is stopped by the extension arm

2252. Under this circumstance, the D-shaped wheel 2211 is not contacted with the thermal transfer paper 20, so that the thermal transfer paper 20 is printed by the thermal transfer printing module 21.

From the above description, the present invention provides a thermal transfer printing device. The operations of the driving gear, the switching roller, the stopper and the D-shaped ejecting roller are controlled according to the friction force generated by the spring. In a case that the thermal transfer printing device of the present invention is in the printing status, the D-shaped ejecting roller is not contacted with the thermal transfer paper. Since the printing task of the subsequent segment of the thermal transfer paper is not adversely affected, the printing quality is enhanced. In a case that the thermal transfer printing device of the present invention is in the paper-ejecting status, the D-shaped ejecting roller is switched to be contacted with the thermal transfer paper in order to output the thermal transfer paper. As a consequence, the thermal transfer printing device of the present invention can provides enhanced printing performance in order to meet the user's demand.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A thermal transfer printing device, comprising:

a thermal transfer printing module for printing a thermal transfer paper; and a paper ejecting module arranged downstream of said thermal transfer printing module for outputting said thermal transfer paper, and said paper ejecting module comprising:

a D-shaped ejecting roller for transporting said thermal transfer paper;

a driving gear connected with said D-shaped ejecting roller, wherein said driving gear is not synchronously rotated with said D-shaped ejecting roller, and said driving gear is driven to be rotated in a first rotating direction or a second rotating direction;

a switching roller connected with said D-shaped ejecting roller and synchronously rotated with said D-shaped ejecting roller for controlling whether said D-shaped ejecting roller is contacted with said thermal transfer paper or not;

a spring connected with said driving gear and said switching roller, wherein in response to rotation of said driving gear, said spring provides a friction force to said switching roller, so that said switching roller is synchronously rotated with said driving gear; and a stopper disposed beside said switching roller, wherein during said thermal transfer paper is printed by said thermal transfer printing module and said driving gear is rotated in said first rotating direction, said switching roller is stopped by said stopper from being rotated in said first rotating direction, so that said D-shaped ejecting roller is not contacted with said thermal transfer paper, wherein after said thermal transfer paper has been printed and said driving gear is driven in said second rotating direction, in response to said friction force, said switching roller and said D-shaped ejecting roller are rotated in said second rotating direction, so that said D-shaped ejecting roller is contacted with said thermal transfer paper to output said thermal transfer paper.

2. The thermal transfer printing device according to claim 1, wherein said D-shaped ejecting roller comprises:

a D-shaped wheel selectively contacted with said thermal transfer paper, wherein when said D-shaped wheel is contacted with said thermal transfer paper, said thermal transfer paper is transported by said D-shaped wheel; and a transmission shaft penetrated through said D-shaped wheel, said driving gear and said switching roller.

3. The thermal transfer printing device according to claim 2, wherein said D-shaped wheel comprises:

a flat surface, wherein when said D-shaped ejecting roller stops rotation with said switching roller, said flat surface is not contacted with said thermal transfer paper; and an arc-shaped surface, wherein when said D-shaped ejecting roller is rotated in said second rotating direction in response to said friction force, said arc-shaped surface is contacted with said thermal transfer paper to output said thermal transfer paper.

4. The thermal transfer printing device according to claim 2, wherein said paper ejecting module further comprises:

an upper cover, wherein said transmission shaft and said driving gear are covered by said upper cover, but said D-shaped wheel is exposed outside said upper cover; and an ejecting idler assembly disposed under said D-shaped ejecting roller for assisting in outputting said thermal transfer paper, wherein when said D-shaped ejecting roller stops rotation with said switching roller, a gap is defined between said D-shaped ejecting roller and said ejecting idler assembly.

5. The thermal transfer printing device according to claim 4, wherein said ejecting idler assembly comprises:

an idler wheel disposed under said D-shaped ejecting roller for contacting said thermal transfer paper; and an idler spring for providing an elastic force to said idler wheel, so that said thermal transfer paper is pressed by said idler wheel.

6. The thermal transfer printing device according to claim 4, wherein said stopper comprises:

a pivotal shaft disposed on said upper cover, and rotatable relative to said upper cover; and an extension arm extended from said pivotal shaft and permitted to be swung relative to said upper cover by using said pivotal shaft as a fulcrum, wherein when said switching roller is rotated in said first rotating direction in response to said friction force, said extension arm is contacted with said switching roller to hinder rotation of said switching roller, wherein when said switching roller is rotated in said second rotating direction, said extension arm is pushed by said switching roller, so that said extension arm is swung relative to said upper cover without hindering said switching roller from being rotated in said second rotating direction.

7. The thermal transfer printing device according to claim 1, wherein said switching roller comprises:

an outer surface disposed on an outer periphery of said switching roller, wherein when said switching roller is rotated in said second rotating direction, said stopper is pushed by said outer surface, so that said stopper is swung, wherein during said stopper is swung, said stopper does not hinder said D-shaped ejecting roller from outputting said thermal transfer paper; and a notch disposed beside said outer surface, wherein when said switching roller is rotated in said first rotating direction, said notch is contacted with said stopper, so that said switching roller is stopped by said stopper.

8. The thermal transfer printing device according to claim 1, wherein a first terminal of said spring is sheathed and connected with said driving gear, and a second terminal of said spring is sheathed and connected with said switching roller.

9. The thermal transfer printing device according to claim 1, further comprising:

an electrical energy storage element for providing electricity;

a driving device connected with said electrical energy storage element, wherein by acquiring said electricity from said electrical energy storage element, said driving device provides a motive power;

a transmission gear set connected with said driving device and said paper ejecting module for transmitting said motive power to said driving gear, so that said driving gear is rotated in said first rotating direction or said second rotating direction; and a transport roller assembly arranged upstream of said thermal transfer printing module for contacting said thermal transfer paper, thereby transporting said thermal transfer paper to said thermal transfer printing module.

10. The thermal transfer printing device according to claim 1, wherein said thermal transfer printing module comprises:

a thermal print head for heating said thermal transfer paper, thereby printing said thermal transfer paper; and a print roller disposed under said thermal print head, wherein during said thermal transfer paper is printed by said thermal transfer printing module, said thermal transfer paper is transported and pressed by said print roller.

* * * * *